United States Patent [19]

Rozwadowski et al.

[11] 4,363,589

[45] Dec. 14, 1982

[54] VIBRATING BIN UNLOADER

[75] Inventors: Boleslaw Rozwadowski, Tappan, N.Y.; Leonard E. Bucklew, Houston, Tex.

[73] Assignee: General Foods Corporation, White Plains, N.Y.

[21] Appl. No.: 174,962

[22] Filed: Aug. 4, 1980

[51] Int. Cl.³ .............................................. B65B 21/02
[52] U.S. Cl. .................................. 414/415; 414/421; 222/161; 222/196
[58] Field of Search ................ 414/415, 421; 222/161, 222/164, 165, 166, 196

[56] References Cited

U.S. PATENT DOCUMENTS

| | | |
|---|---|---|
| 2,246,497 | 6/1941 | Beck . |
| 2,578,116 | 12/1951 | White et al. ........................ 414/421 |
| 3,078,015 | 2/1953 | Wahl . |
| 3,261,508 | 7/1966 | Wahl . |
| 3,380,599 | 4/1968 | Cugini ................................. 414/421 |
| 3,854,612 | 12/1974 | Snape ................................. 414/415 |
| 4,310,106 | 1/1982 | Greck et al. ........................ 222/161 |

OTHER PUBLICATIONS

Food Engineering, "Tilting Bins Supply Product to Machines on Floor Below", Nov., 1979, p. 210.
Vibra Screw Brochure, "Portable Bin Unloader", Jan., 1979.
Standard Handbook for Mechanical Engineers, Editors, Baumeister, Avallone, Baumeister III; 1978; pp. 5-67 to 5-76.

Primary Examiner—H. Grant Skaggs
Attorney, Agent, or Firm—Jonathan B. Schafrann; Thomas R. Savoie; Daniel J. Donovan

[57] ABSTRACT

An arrangement for unloading a bulk product bin of the type adapted to store a granulated or powdered product, and providing for tilting of the bin and vibration thereof in a tilted position while isolating the surrounding environment from vibrations induced in the product bin. The arrangement includes a base frame, an intermediate frame pivotably mounted on the base frame and a vibratory frame mounted on the intermediate frame. The intermediate frame pivots about a shaft relative to the base frame to a predetermined tilt angle, and isolation mountings are provided between the vibratory and intermediate frames mounted at the predetermined angle relative thereto. In this arrangement, the isolation mountings are positioned at the predetermined angle relative to a vertical when the intermediate frame is in an untilted position, but are mounted in a substantially vertical position when the intermediate frame is tilted to the predetermined angle. A vibrating assembly is mounted on the vibratory frame, and induces vibrations in both the frame and a product bin supported thereby.

7 Claims, 5 Drawing Figures

VIBRATING BIN UNLOADER

TECHNICAL FIELD

The present invention relates generally to an arrangement for unloading a bulk product bin of the type adapted to store a granulated or powdered product therein. More particularly, the present invention relates to an arrangement facilitating unloading of a product bin by providing for tilting of the bin towards one side and vibrating of the bin in its tilted position. The present invention was particularly designed to be compatible with tote bins in common usage in many industries for the storage and dispensing of miscible products of a granular or powdered form which are particularly susceptible of being stored in such bins.

In many applications the utilization of bulk storage bins or hoppers has many advantages over alternative modes of transporting and storing powdered, granular or pulverized materials. The filling and discharge openings of each storage bin may be provided with a hermetic seal to prevent the entry of any contaminants into the system or process. Furthermore, the storage bins are easily handled by a fork lift truck which slides its forks under the bin legs and provides relatively simple and convenient handling of the storage bins, whether empty or full. For these and other reasons, storage bins or hoppers present a rapidly growing manner of storing and shipping dry bulk materials. They offer the convenience of easy handling and mobility, the reduced cost of semi-bulk storage, and greater safety and security in product handling.

A major disadvantage of such portable bins has been that they have encountered discharge problems when handling materials that have difficulty in flowing, especially materials which tend to pack in the bin because of jarring and jolting encountered during shipment thereof. It would be advantageous to have a convenient arrangement providing for unloading of storage bins regardless of how solidly or densely packed the material is therein. In those instances, the stored material being emptied often sticks to the sides of the hopper and forms flow-encumbering product jams thereat.

The problems encountered with the discharge of powdered or granular materials is actually quite complex since it involves many variable factors such as the size, shape and character of the particulate material, varying temperature and humidity, etc. Fibrous, sticky materials and the like have a tendency to form flow-encumbering jams across even large horizontal distances. A further problem encountered in this art is the stagnation of material around the bin walls, with the material toward the center of the bin moving out preferentially and resulting in what is commonly termed in the art as "rat-holing".

The provision of a reliable, positive and continuous flow of stored miscible materials from a bulk storage hopper has been an especially vexing and clostly problem in many automated processing applications wherein stored solids are continuously moved from storage into a process, and disruption in the flow thereof can result in the process operating outside its specifications. In fact, it has been estimated that many millions of dollars are lost each year because of process interruptions due primarily to the faulty flow of materials from storage bins. In a typical prior art process, each storage bin or hopper is mounted in an elevated position and is discharged by gravity into a discharge line feeding a packaging machine on the floor below. Constant head pressure from the elevated material is relied upon to maintain the packaging machines running smoothly at an optimum rate.

The design of storage hoppers or bins has been the subject of much research and development, both mathematical and empirical in nature. Storage bins are generally one of either two types, bins having a centrally-located bottom discharge outlet, and those having a side-located discharge outlet. The metal interior of a typical well-designed storage bin has rounded corners and smooth seams which provide for a smooth discharge of material from the bin and also relatively easy cleaning thereof. However, experience has indicated that even the best bin designs do not provide a dependable discharge of stored material without the use of auxiliary discharge devices operatively associated therewith.

Many auxiliary devices and arrangements have been proposed in the prior art which will promote the outflow of material from a storage bin, including vibrators mounted to an exterior surface of a storage bin, multiple screw conveyors arranged across the bottom of the bin, sweep arms operating as giant rotating agitators within a storage bin, pulsating pads selectively placed along an inner wall of the bin, etc. Rotating agitators are sometimes impractical with hoppers of very large size because of the difficulty encountered in agitating large masses of powdered or granular material. Further, the relatively small amount of vibration provided by shaker plates and similar equipment is often not tranmitted to the entire mass of material stored within the hopper such that sticking and jamming of the material is not completely eliminated. While some of the prior art devices and arrangements have proved to be satisfactory for use under limited operating conditions with certain types of materials, none has proven to be entirely satisfactory for use with really difficult-to-handle materials.

The present invention proposes to overcome the aforementioned shortcomings of many prior art arrangements by providing a hopper suspension and vibration system which is relatively simple in its construction and which protects each storage bin against damage when it is being loaded or unloaded, generally with a fork lift or similar hydraulic equipment.

DISCLOSURE OF THE INVENTION

The present invention relates to an arrangement for facilitating the unloading of a bulk product bin or container of the type adapted to store a granulated or powdered product therein.

More specifically, the present invention provides an arrangement for facilitating the unloading of a bulk storage product bin by tilting thereof and by inducing vibrations in the bin while in its tilted position. The arrangement includes a base frame and an intermediate frame pivotally mounted relative thereto such that the intermediate frame can be tilted during unloading of a product bin. A vibratory frame is mounted on the intermediate frame and has its upper surface contoured to support a product bin placed thereon. Vibration isolation mountings for the vibratory frame are utilized to isolate the base and intermediate frames from vibrations induced in a product bin supported by the arrangement. Vibrations are induced in the vibratory frame and a product bin supported thereon by a vibrator assembly mounted to the vibratory frame.

In accordance with a preferred embodiment of the present invention, the base, intermediate and vibratory frames have a substantially quadrilateral shape with four corners to accommodate a quadrilaterally shaped bulk storage bin, and four isolation mountings are provided for the vibratory frame, one at each corner thereof. Furthermore, the intermediate frame pivots relative to the base frame by a predetermined tilt angle, and the four isolation mountings extend between the intermediate and vibratory frames at the predetermined tilt angle relative to a vertical when the intermediate frame is not tilted. This arrangement results in the four isolation mountings being in a substantially vertical position when the intermediate frame is tilted to the predetermined angle to facilitate unloading of the product bin. In accordance with a preferred embodiment, the vibratory frame is designed with a pair of channels in its upper surface extending from the front to the rear thereof to enable a fork lift type of vehicle to load and unload a product bin thereon. Furthermore, the intermediate frame is provided with bumpers at its forward edge to contact a fork lift vehicle as the vehicle approaches the arrangement to load or unload a product bin on the vibratory frame. Proper positioning of a product bin on the vibratory frame is an important consideration as the vibratory frame supports a product unloading chute including a substantially vertically extending rear chute plate against which a product bin is adapted to be positioned. A resilient seal extends around the periphery of the rear chute plate to seal the product bin relative thereto, and the aforesaid bumpers prevent a product bin being positioned by a fork lift truck from rupturing the pliable seal.

The present invention sets forth an arrangement for unloading a bulk product bin by providing for tilting of the bin and vibration thereof in a tilted position while isolating the surrounding environment from the substantial vibrations induced in the product bin and its contents.

A BRIEF DESCRIPTION OF THE DRAWINGS

A description of a vibrating product bin unloader constructed pursuant to the teachings of the present invention may be more readily ascertained by one skilled in the art, having reference to the following detailed description of a preferred embodiment thereof, taken in conjunction with the accompanying drawings, in which.

DETAILED DESCRIPTION OF THE DRAWINGS

Figure 1:
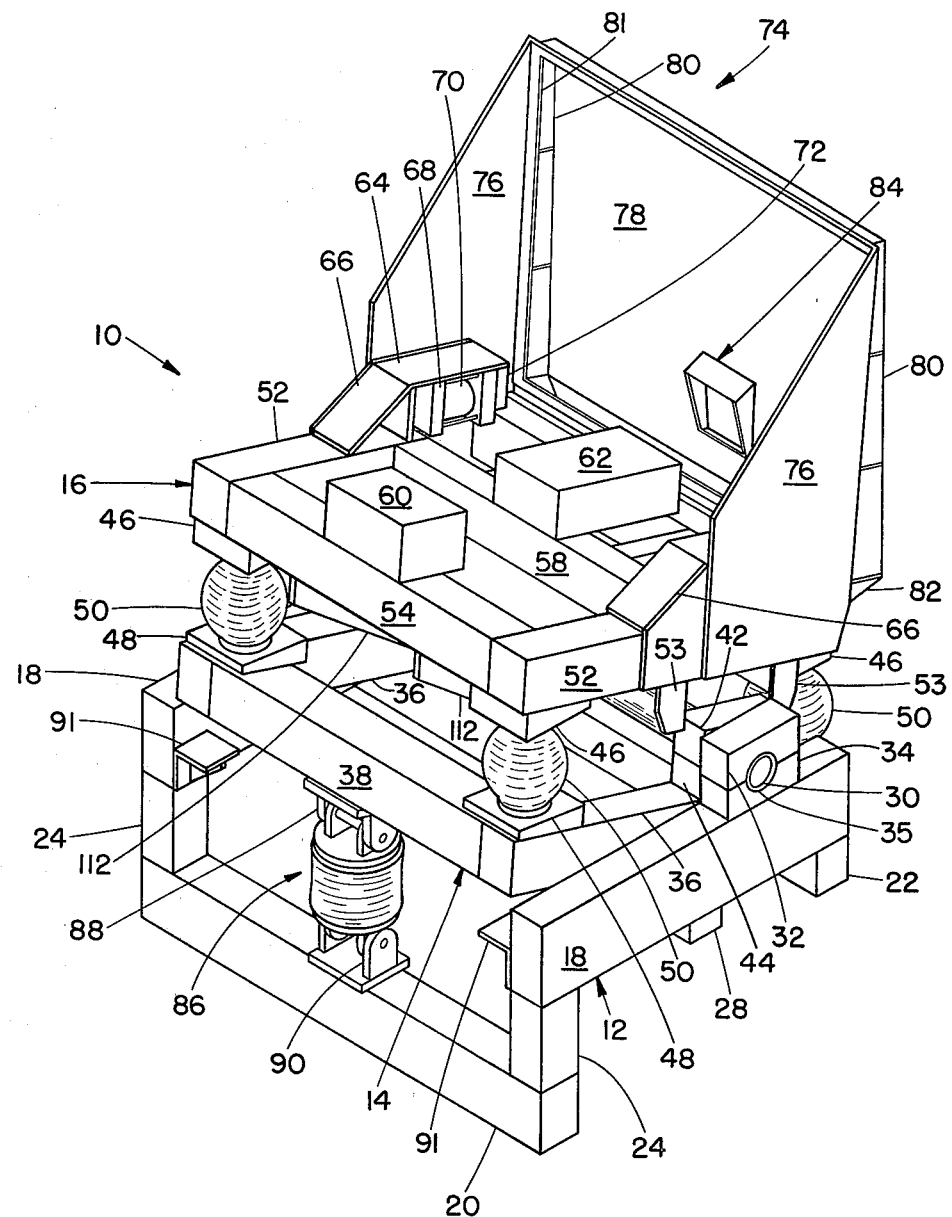
FIG. 1 is a frontal perspective view of a preferred embodiment of the present invention for a vibrating bin unloader, shown without a product bin or hopper on top thereof.
Figure 2:
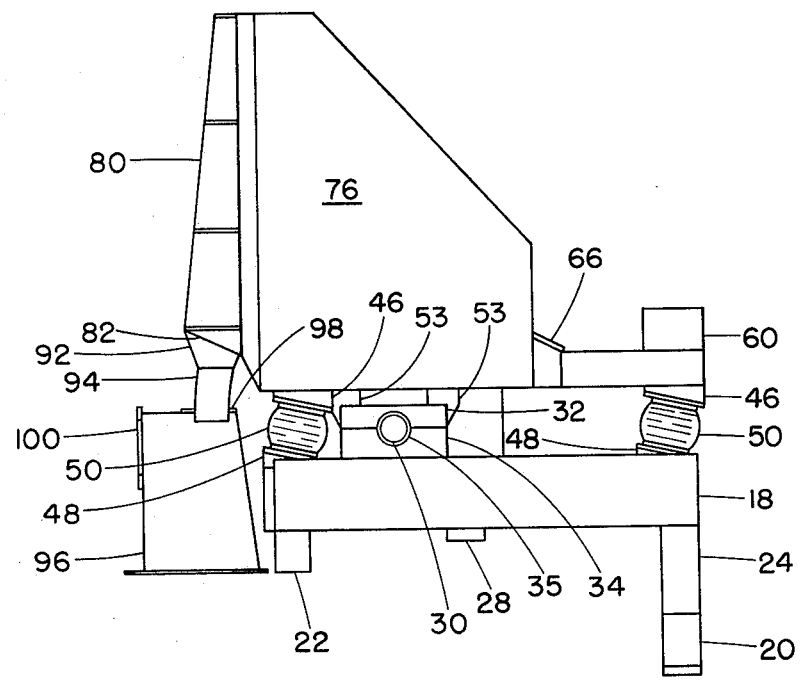
FIG. 2 illustrates a side elevational view of the vibrating bin unloader shown in FIG. 1.

Referring to the drawings in detail, FIG. 1 illustrates a frontal perspective view of a vibrating bin unloader arrangement 10 having three separate frame assemblies, a base frame 12, an intermediate tilting frame 14, and a top vibratory frame 16.

The base frame 12 is constructed of symmetrically placed forward-to-rearward rectangular side frame members 18 extending along each side of the frame, a front cross frame member 20 extending across the front width thereof, and a rearward base frame member 22 extending across the rear width of the frame directly beneath the side frame members 18. Relatively short, vertical corner leg members 24 connect the front cross frame member 20 with the side frame members 18 at each of the front corners of the arrangement. An intermediate cross frame member 28 extends across the width of the base frame at a position intermediate the length thereof. The intermediate cross frame member 28 is positioned between and slightly below the side frame members 18. The shape of the base frame, and particularly the lower position of the front cross frame member 20 relative to the rear cross frame member 22, is determined, to a degree, by the shape of the structure upon which the base frame is to be positioned.

The intermediate tilting frame 14 is rotationally mounted to the base frame by a round shaft 30 extending across the width of the base frame at a location intermediate the front and back thereof but preferably closer to the rear. The shaft is mounted on top of each of the side frame members 18 by symmetrical top and bottom shaft mountings respectively 32 and 34, each of which has an opposed hemispherical cut-out therein to accommodate mounting of a shaft bearing or bushing 35 therebetween. The top and bottom shaft mountings and the side frame members may be coupled together by vertically extending bolts to facilitate mounting of the shaft to the base frame.

The intermediate tilting frame 14 is constructed of symmetrical forward-to-rearward side frame members 36 extending along each side of the length of the frame, with each side frame member 36 being positioned parallel to and just inside the corresponding side frame member 18 of the base frame. Front and rear cross frame members respectively 38 and 40 extend across the width of the intermediate frame 14 at the front and rear thereof between the side frame members 36. The intermediate frame is rotationally mounted about shaft 30 by top and bottom shaft mounting members 42 and 44, each of which has an opposed hemispherical cut-out therein to accommodate mounting of the rotational shaft 30. The top and bottom shaft mountings and the side frame members may be coupled together by vertically extending bolts positioned therebetween.

The top vibratory frame 16 is mounted on the intermediate frame by four hydraulic isolators 50, one at each of the four corners of the frames. Each isolator is mounted in a forwardly inclined position by top and bottom angular isolator mountings 46 and 48. The magnitude of the forward angle of inclination of each isolator is selected to be equal to the angle of tilt of the intermediate frame relative to the base frame, such that when the intermediate frame is in a tilted position, shown partially in phantom in FIG. 3, the hydraulic isolators are vertically mounted. The vertical mounting of the isolators in the tilted position of the intermediate frame is chosen to minimize radial stress on the isolators when the top frame is in a tilted position and is being vibrated during unloading of a product bin. The hydraulic isolators may be commercially-available units such as those supplied by Firestone Corp. under the designation #123.

The top vibratory frame 16 includes symmetrical forward-to-rearward side frame member 52 extending along each side of the length of the frame. Downwardly depending plates 53 are mounted on each side frame member 52 and extend downwardly immediately forward and rearward of the shaft mounting members 42, 44. The plates 53 limit the forward and rearward movement of the vibratory top frame 16 relative to the intermediate tilting frame 14 by direct contact between the plates 53 and the shaft mounting members 42, 44. Accordingly, if a fork lift vehicle were to accidentally jar the vibratory frame in either a forward or rearward direction, the plates 53 would limit the resulting forward-rearward movement of the vibratory frame to prevent damage to the hydraulic isolators 50, etc. Front and rear frame members, respectively 54 and 56, extend across the width of the top vibratory frame 16 at the front and rear thereof between the side frame members 52. An intermediate cross frame member 58 also extends across the width of the top vibratory frame at a position intermediate the length thereof.

A front-elevated product bin mount 60 is centrally mounted on top of the front frame member 54, and a rear-elevated product bin mount 62 is centrally mounted between the rear and intermediate cross frame members 56 and 58. Furthermore, side-elevated product bin mounts 64 are mounted on top of the vibratory side frame members 52 near the rear thereof. Each side-elevated product bin mount 64 has an inclined forward ramp surface 66 which is provided to deflect upwardly the product or tote bin which is being placed, as by a fork lift truck, on the product bin unloader from the front thereof in an insufficiently elevated position. Each elevated side mount 64 houses therein a hydraulic cylinder 70 which is utilized to clamp a product bin in a properly sealed position relative to the bin unloader structure. The hydraulic cylinder 70 is supported by a vertically extending base plate 68, and actuates a clamping face 72 which bears against downwardly depending feet on the product bin and which urges the bin in a rearward direction and into proper position relative to sealing structure 74 at the rear of the product bin unloader.

The configuration of the elevated supports 60, 62 and 64 are such as to allow the forks of fork lift equipment to extend beneath a product bin on the unloader arrangement on both sides of the central elevated supports 60 and 62. The elevated supports contact the bottom surface of the bin thereby eliminating the need to rely on the downwardly depending and oftentimes bent feet, typically located at the bottom four corners of the bin, to support the bin in a level manner. Furthermore, the forward-to-rearward dimensions of the product bin unloader arrangement are such that a typical fork lift truck will encounter cross member 20 and upstanding members 24 of stationary base 12 and be stopped by the front structure of the unloader before the forward tips of the forks encounter the rear sealing structure 74.

The product bin sealing structure 74 provided at the rear of the bin unloader includes side surfaces 76 on each side of a loaded product bin and a vertically extending rear surface 78 against which a product bin is adapted to be sealed. A rubber seal 81 is provided around the periphery of the rear surface 78 to effectively seal a product bin relative thereto. A metal securing strip 83 may be provided on top of the seal 81 to securely attach and fasten the same to the backing surface 78. A small access door 84 is provided in the rear surface 78 to provide access to a valve in a product bin placed on the unloader arrangement which controls the discharge flow of product from a product bin into the discharge chute 94. Side chute surfaces 80 couple sides 76 to the rear surface 78, and extend into lower funneling surfaces 82 and 92 which direct the discharged product into a bottom chute 94 through which the stored product is discharged.

Tilting of the intermediate and vibratory frames relative to the base frame is under control of a hydraulic actuator 86 which is pivotally coupled to the bottom of the front cross frame member 38 of the intermediate frame by pivotal mounting 88. The hydraulic actuator is also pivotally coupled to the top of the front cross frame member 20 of the base frame 18 by a second pivotal mounting 90. The hydraulic actuator may be a commercially-available unit such as one supplied by Firestone Corp. under the designation #26. Furthermore, in alternative embodiments the actuator might be pneumatic, electrical or mechanical type of unit, depending upon the particular power and design requirements of an installation.

Figure 3:
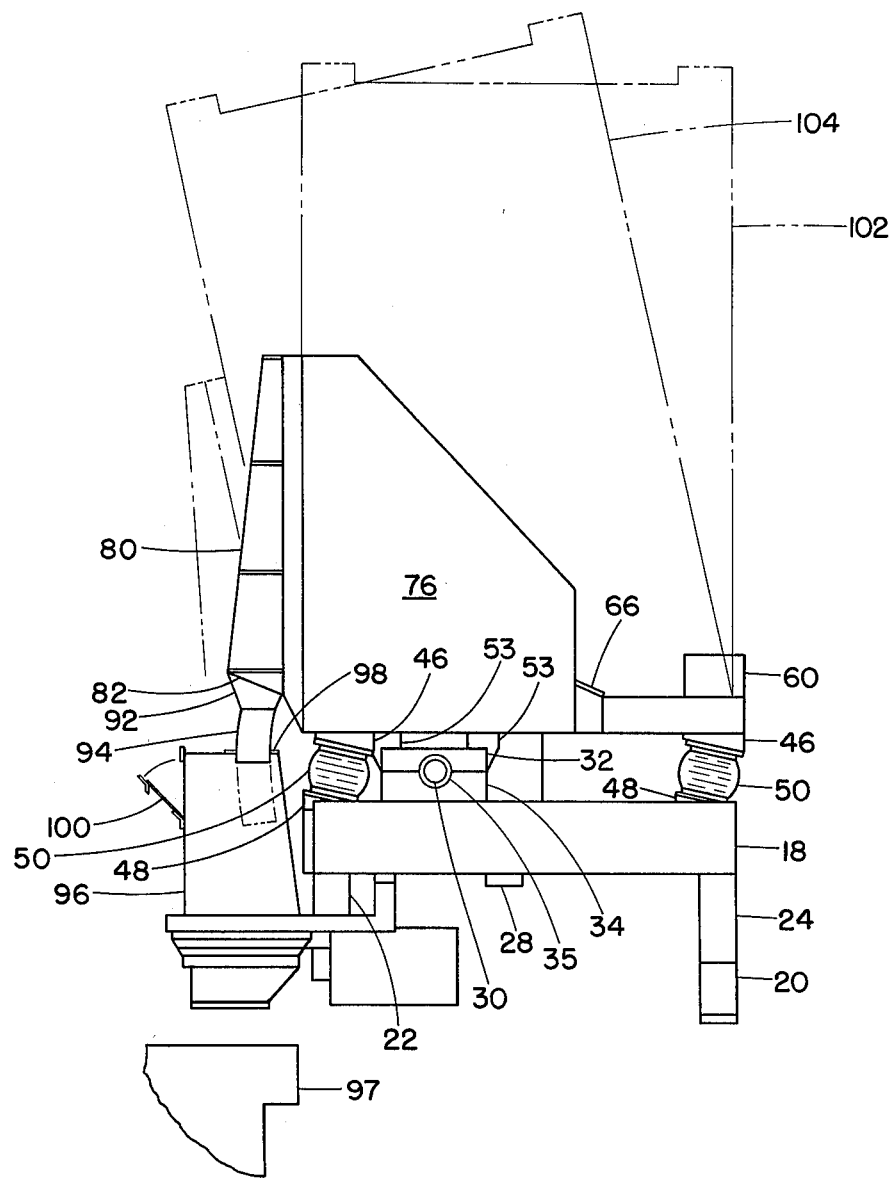
FIG. 3 is a side elevational view similar to FIG. 2, but additionally illustrates a bulk storage bin thereon in two positions, in a first of which the storage bin is in a vertical position and in a second of which the bin is tilted to assist in unloading of product stored therein.
Figure 4:
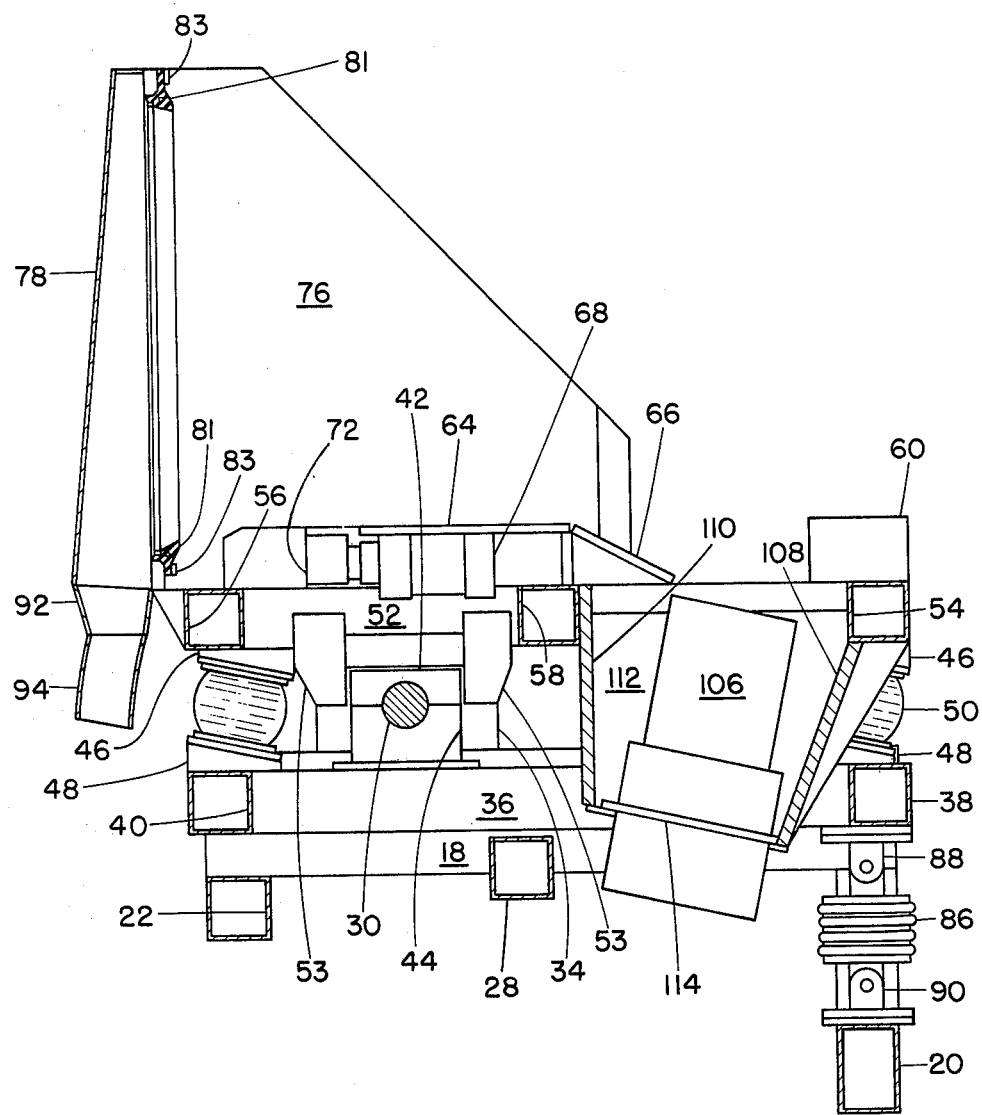
FIG. 4 represents a sectional, elevational view of the embodiment shown in FIGS. 1 through 3, taken near the middle thereof along a forward to rearward section.
Figure 5:
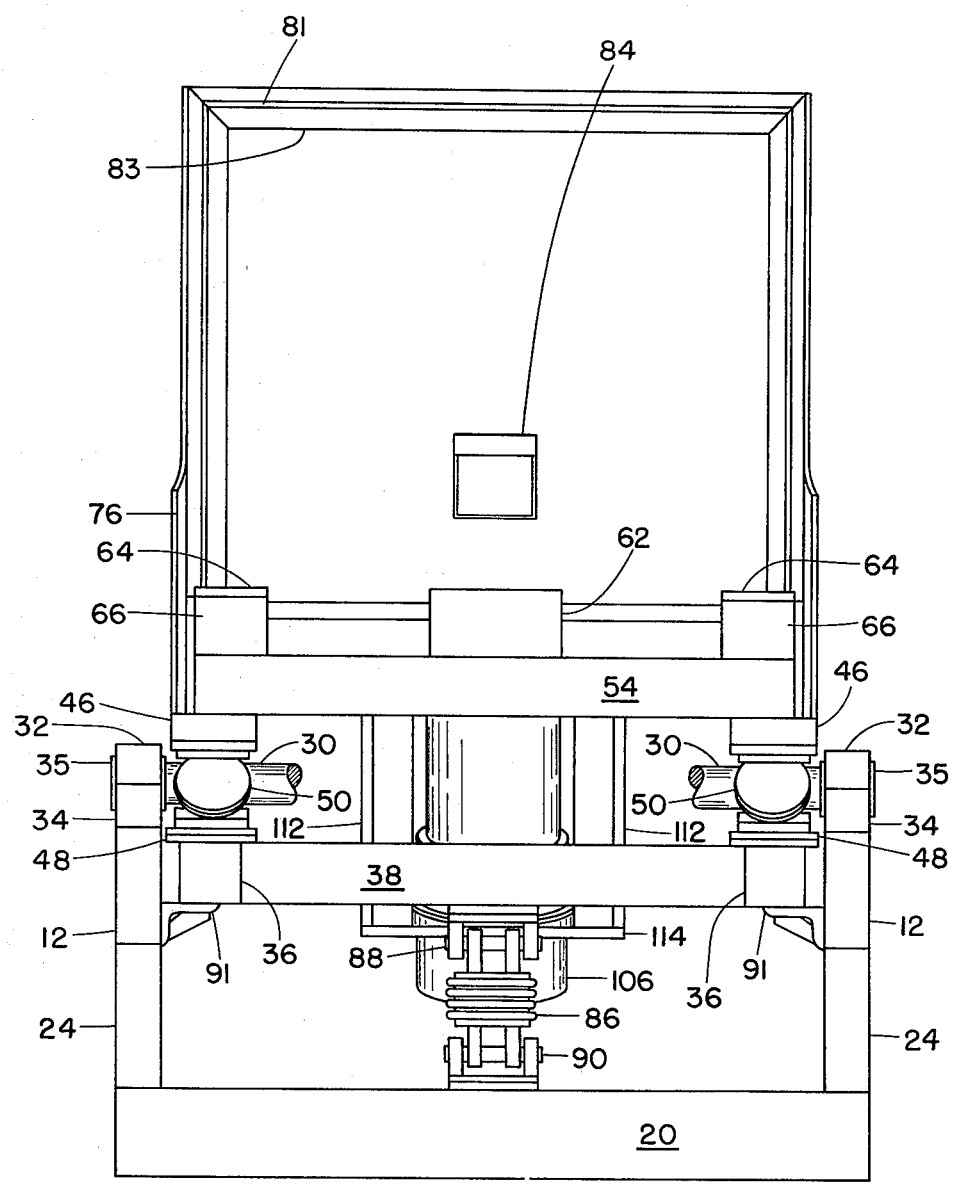
FIG. 5 is a frontal elevational view of the embodiment shown in FIGS. 1 through 4, and illustrates additional details on the construction thereof.

The intermediate frame is supported in an untilted horizontal position by L-shaped brackets 91 on the inner front surface of side frame members 18, which effectively limit the downward movement of the intermediate tilting frame at the front thereof. As illustrated in FIG. 3, as the product bin is tilted from a vertical position 102 into an unloading position 104, the discharge chute 94 is rotated downwardly about shaft 30 into an unloader chute 96 which ultimately directs the discharged product into suitable utilization apparatus 97, such as packaging machine. A linear seal 98 is provided around the chute entry into the unloader 96 to seal the product bin unloader relative to the subsequent processing equipment. A small, pivotally-openable chute door 100 is provided on the rear surface of the unloader chute 96 to allow access to the discharge opening in chute 94.

A vibrator assembly 106 is mounted on the vibratory frame 16 between the forward and intermediate cross frame members 54 and 58. The mounting therefore includes a forward plate 108 extending downwardly from forward cross frame member 54 and a rear plate 110 which extends downwardly from intermediate cross frame member 58. Left and right side plates 112 extend forward to rearward between the front and back plates 108 and 110, and the vibrator 106 is mounted by a substantially horizontal mounting member 114 between the encompassing plate housing formed by plates 108, 110, 112 and 114. The vibrator assembly 106 is mounted with the same forward incline as the hydraulic isolators 50 such that the vibrator assembly 106 is in a substantially vertical position when the intermediate frame is tilted fully rearward, as shown at 104 in FIG. 3. The vibrator assembly may be any commercially-available unit, such as that distributed by the Vibro Company, or a similar type of product.

The structural components of the base, intermediate and vibratory frames may be formed of commercially-available, rectangular steel stock with the various portions of each separate frame being welded together into one integral frame structure. The plates forming the elevational mountings, the bin sealing structure and the vibrator assembly support structure may all be formed of suitable steel or aluminum plate stock.

While a particular embodiment of the present invention and several variations have been described in detail, it should be realized that the teachings herein will suggest many other embodiments and modifications to one skilled in the art.

What is claimed is:

1. An arrangement facilitating the unloading of a product bin through tilting thereof and inducing vibrations in the bin while in a tilted position, comprising:
   (a) a stationary base frame of essentially cuboidal dimensions;
   (b) an intermediate frame pivotally journaled on opposed members of said base frame for tilting movement relative to said intermediate frame during unloading of product bin supported on the arrangement;
   (c) means for tilting said intermediate frame relative to said base frame to assist in unloading a product bin supported by the arrangement;
   (d) a vibratory frame on said intermediate frame, mounting means extending intermediate said vibratory and intermediate frames, said vibratory frame having its upper surface contoured to support a product bin placed thereon, said mounting means comprising hydraulic isolation means for isolating said intermediate frame from vibrations induced in a product bin supported on the vibratory frame; and
   (e) means for inducing vibrations to said vibratory frame and the product bin thereon to assist in the unloading of said bin.

2. An arrangement as claimed in claim 1, said vibratory frame having a substantially quadrilateral shape with four corners to accommodate a quadrilateral-shaped product bin, said hydraulic isolating means including at least four isolation mountings, one mounted at each corner of said vibratory frame.

3. An arrangement as claimed in claim 2, said means for tilting said intermediate frame relative to said base frame comprising means for tilting said intermediate frame to a predetermined tilt angle, said hydraulic isolation mountings extending intermediate said intermediate frame and said vibratory frame at said predetermined tilt angle relative to a vertical position when the intermediate frame is not tilted with respect to said base frame and being positioned in a substantially vertical position when said intermediate frame is tilted at said predetermined angle relative to said base frame.

4. An arrangement as claimed in claim 1, said tilting means including a hydraulic lift.

5. An arrangement as claimed in claim 1 or 2, said intermediate frame being pivotally mounted relative to said base frame about a shaft extending across the width of said stationary base frame at a location intermediate the front and back thereof.

6. An arrangement as claimed in claim 5 wherein the shaft is closer to the rear than the front of the intermediate frame.

7. An arrangement as claimed in claim 1, including stop means at the forward edge of said stationary base frame thereof adapted to be contacted by a fork lift vehicle as the vehicle approaches the arrangement so as to properly position the vehicle relative thereto.

* * * * *